Aug. 7, 1951 — E. G. PEEBLES — 2,563,359
PENDULUM DRIFT INDICATOR
Filed March 12, 1946 — 3 Sheets-Sheet 1

INVENTOR.
EDGAR G. PEEBLES,
BY
ATTORNEY.

Aug. 7, 1951  E. G. PEEBLES  2,563,359
PENDULUM DRIFT INDICATOR
Filed March 12, 1946  3 Sheets-Sheet 3

INVENTOR.
EDGAR G. PEEBLES,
BY
ATTORNEY.

Patented Aug. 7, 1951

2,563,359

UNITED STATES PATENT OFFICE 2,563,359

PENDULUM DRIFT INDICATOR

Edgar G. Peebles, Los Angeles, Calif.

Application March 12, 1946, Serial No. 653,727

8 Claims. (Cl. 33—205.5)

My invention relates generally to inclinometers, and more particularly to such devices which are known in the art as drift recorders and are used to measure the deviation from vertical of a well or hole drilled in the earth to a relatively great depth.

In the drilling of wells, it is quite important, because of the property interest involved, to know where the lower end of the well is located. While angular or whipstock drilling may occasionally be done, it is generally desirable that the lower end of the well be as nearly vertically aligned with the upper end as possible; and to secure this result, it is desirable that the well be substantially vertical for its entire length. Should the bit or other drilling tool, which is used in forming the well, start to wander or deviate from the vertical, an experienced operator may control his equipment so that the drill is returned to vertical. This may be done readily if the deviation is detected within a few feet of the time that it starts; but if the angular path has been followed for several hundred feet, it is very difficult to return the well to its original alignment. For this reason, it is very desirable that the inclination or the deviation of the well from vertical be checked at frequent intervals; and it is therefore important that a method of checking be provided which may be easily performed and consume a minimum of time.

Furthermore, since the equipment which is used in the drilling of wells receives very rough treatment and is subjected to severe mechanical shock, it is necessary to have equipment which is ruggedly constructed, while still being sensitive enough to provide accurate records. In addition, because of the rough treatment to which it is subjected, it is advisable to have a self-checking means which will indicate any defect or maladjustment of the instrument so that incorrect records may be immediately detected and the instrument providing them may be repaired or replaced before additional records are made.

While instruments have previously been designed which will provide a plurality of records showing the inclination of the well at a given point, these previous instruments have usually consisted of two separate recording devices which are operated simultaneously to provide two records which should be the same, and which, if different, indicate defective equipment or improper operation.

It has also been necessary in many of these previous instruments to remove the entire drill string or mechanism suspending and rotating the drill in order to make the desired record; and where the well is several thousand feet deep, this has been such a laborious and time consuming operation that records were made much less frequently than they should be in order to provide the desired control of the well.

It is therefore the major object of my invention to provide a drift recording apparatus which may easily be operated to provide any desired number of recordations for a given location of the instrument, so that the accuracy of the instrument is constantly checked, and which may be used without the necessity of removing the drill string from the well.

It is another object of my invention to provide a drift recorder of simple and rugged construction, yet possessing sufficient accuracy to indicate very minor deviations of the well from the true vertical.

It is a further object of my invention to provide such a device wherein the making of the record may be controlled from the upper end of the well after the instrument has been lowered into it, the time and number of recordations which are made being under the control of the operator at all times.

It is still another object of my invention to provide such a device which may be used with drills having any internal and external dimensions, the same instrument being adaptable for use with drills of all sizes by means of adapters which may be attached to the instrument or "subs" which are assembled in the drill string when the drill is attached thereto.

Another object of my invention is to provide a device which will furnish a record which instantly indicates whether the device is operating properly, whether it has been bent and subjected to misalignment, or whether it has become dirty so that the bearing surfaces no longer function properly.

These and other objects of my invention will become apparent from the following description of a preferred and modified form thereof, and from the drawings illustrating those forms, in which.

Figure 1:
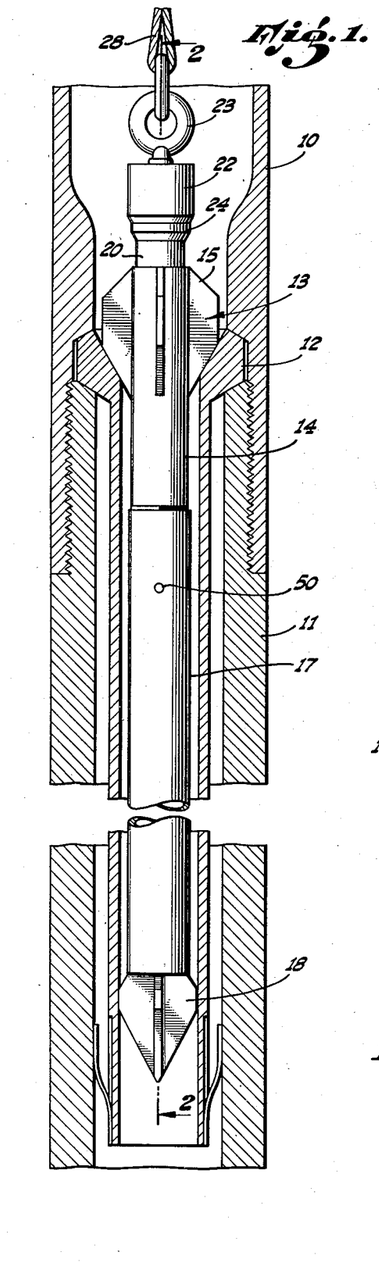
Fig. 1 is a cross-sectional view of the lower end of a drill string with my improved recording device located therein and shown in elevation.

Referring now to the drawings, and particularly to Fig. 1, thereof, the numeral 10 indicates the lower section of a tool joint, such as is used for joining sections of drill pipe together. A drill collar 11 is threadedly connected to the tool joint 10, and a bit (not shown) is connected to the lower end of the drill collar in the usual manner. Between the drill collar 11 and the tool joint 10, I have indicated an adapter or "sub" 12 whose function is to extend coaxially with the hole being drilled, and to center the drift recording apparatus 13 with respect to the hole and hold it aligned therewith. If the internal diameter of the drill collar 11 is of the proper size, and if the smaller internal diameter of the tool joint 10 is of the correct dimensions, the adapter 12 will not be needed; but in order to permit the recording apparatus 13 to be used where the drill collar 11 and the tool joint 10 have relatively large internal diameters, I make the recording apparatus relatively small and use an appropriate size adapter.

Figures 2, 3, 5:
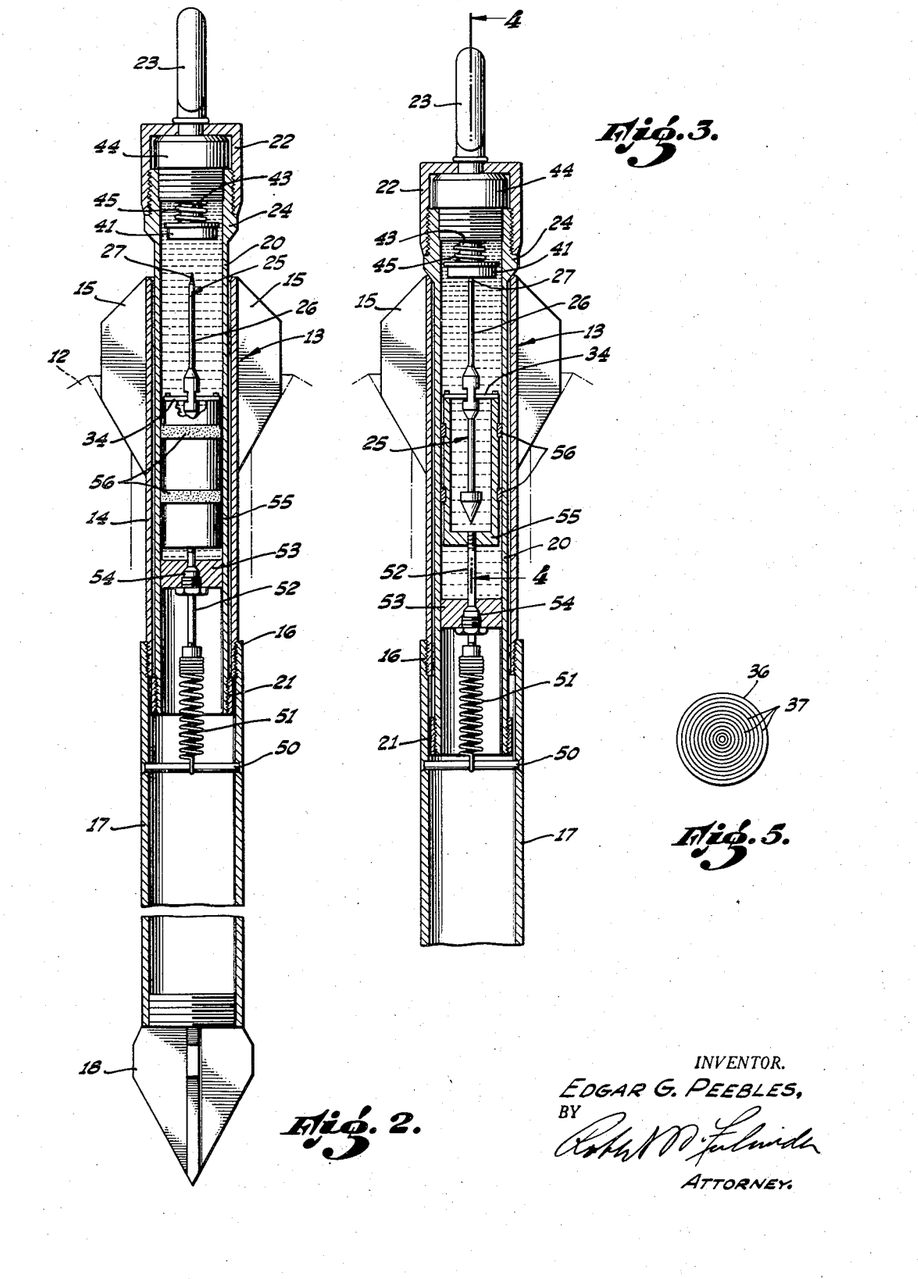
Fig. 2 is a cross sectional view of my preferred form of drift recording device taken at 2—2 in Fig. 1, and showing the relative position of the various parts as they appear while the device is being raised or lowered within the well.
Fig. 3 is a cross sectional view similar to Fig. 2, but showing the parts in their recording position when the device is at the bottom of the well.
Fig. 5 is a plan view of the record element on which the inclination of the well is recorded.

As shown in Fig. 2, the drift recording apparatus 13 comprises an outer housing 14, preferably cylindrical in shape, provided with outward extending radial flanges 15 at its upper end. The lower ends of the flanges 15 are formed at an angle so that they will center the outer housing 14 when they bear against and are supported by a member having a circular opening, such as the adapter 12. The upper surface of the adapter 12, against which the lower edges of the flanges 15 bear, is preferably shaped at a corresponding angle so that the maximum support is provided for the upper end of the housing 14, and the latter is firmly held.

Rigidly attached to the lower end of the housing 14, as by a threaded joint 16, is a spear 17, preferably formed of pipe or other convenient material, and provided with a guide head or point 18 which is removably attached to the spear 17 so that heads of various sizes may be readily interchanged. The guide head 18 is preferably formed of a plurality of flanges, somewhat similar to the flanges 15, connected together to form a generally conical member; and if the drift recorder is to be operated as indicated in Fig. 1, the maximum diameter of the conical portion is such as to permit the point to slide freely within the adapter 12, while permitting substantially no play between the head and the adapter.

Within the housing 14 I provide a cylinder 20 which may readily be axially moved within the housing, while remaining coaxial therewith at all times. The lower end of the cylinder 20 is provided with a collar 21 which is firmly held to the cylinder, and which is adapted to bear against the lower end of the housing 14 and support its weight, together with the weight of the attached spear 17. The upper end of the cylinder 20 is provided with a cap 22 to which a ring 23 is swivelly attached, and the ring may be supported by a wire line 28, used to lower and raise the recording apparatus in the well. When the recording device is supported by the wire line, the various portions of the device are in the position shown in Fig. 2. A boss 24 is formed on the upper end of the cylinder 20; and when the device is supported by the outer housing 14, the boss bears against the upper end of the housing, and the various members are in the position shown in Fig. 3.

The actual recording of the drift or deviation of the well from vertical is performed by a pendulum 25 which is pivotally mounted for rotation about two mutually perpendicular horizontal axes, and which has an upwardly projecting extension 26 provided with a point 27 on its upper end. The pendulum 25 may be of any suitable type, of which many are known in the art, but I have found that a non-magnetic pendulum, comprising a weight 30 connected by a rod 31 to a supporting member 32 which is also connected to the extension 26, forms a very suitable pendulum. The supporting member 32 may have a transverse opening 33 therein through which a cross member 34 may extend, the latter being provided with an upwardly projecting point 35 adapted to fit into a recess in the supporting member, so that the latter is free to turn about perpendicular horizontal axes, the cross member 34 preventing rotation about a vertical axis. The weight 30 is thus pendantly supported by the projection 35, and when properly adjusted, the extension 26 is thereby maintained in a vertical position.

To make a record of the inclination of the cylinder 15 with respect to the pendulum 25, the point 27 is pressed against a disk 36, made of Celluloid or other suitable material, and the disk is thereby punctured or indented. Such disks are known in the art, and are generally inscribed with a series of concentric circles 37, corresponding to degrees of angular variation. The disk 36 is preferably mounted so that it is spherically concave downwardly, thereby insuring that the point 27 will be perpendicular to it at all times. The disk is preferably held to a backing plate 40 by means of a threaded ring 41, having an internal flange or shoulder 42, which bears against the disk. The backing plate 40 is carried by a stem 43 which is slidably mounted in a plug 44 threadedly connected in the upper end of cylinder 20. A spring 45 is placed around the stem 43 between the backing plate 40 and the plug 44 so that the disk 36 is yieldably held. The stem 43 is held within the cap 44 by a nut 46 and washer 47 at the upper end of the stem; and a spring 48, for a purpose hereinafter described, extends between the washer 47 and the cap 44 to oppose the urging of the spring 45. The backing plate 40 is thus capable of vertical movement in either direction, but will tend to return to a normal position determined by the springs 45 and 48.

To move the point 27 toward and away from the disk 36, the cross member 34 is connected, in a manner now to be described, to the outer housing 14 so that movement of the latter with respect to the cylinder 20 is transmitted to the pendulum 25. As shown in Figs. 2 and 3, this connection includes a cross pin 50 which extends across the spear 17 at a point below the lowermost position of the end of cylinder 20. A spring 51, designed to operate in both compression and tension, is attached to the cross pin 50 and extends upwardly therefrom to a connecting rod 52. A partition 53 closes the lower end of cylinder 20, and a packing 54 permits the connecting rod 52 to move through the partition while preventing the passage of fluid. The upper end of connecting rod 52 is connected to a hollow piston 55 mounted within the cylinder 20 and provided with piston rings 56 which may be of cork, metal, or other suitable material. The lower end of the piston 55 is closed, and the connecting rod 52 is preferably threadedly connected to the closure. The upper end of the piston is open, and the cross bar 34 is mounted thereon to extend across the piston. The pendulum 25 thus has its lower half surrounded by the piston 55 while the extension 26, being above the cross member, is not enclosed by the piston.

The pendulum 25 is damped by completely filling the cylinder 20 with oil so that when the cap 44 is installed in the upper end of the cylinder, no air remains in the latter to cause foaming of the oil. The oil, in addition to damping the pendulum 25 so that it comes to rest relatively quickly, also has the effect of retarding the movement of the piston 55 so that if the outer housing 14 is suddenly moved upwardly with respect to the cylinder 20, the movement of the piston 55 will be less rapid and there will be less possibility of hitting the point 27 against the disk 36 with sufficient force to bend the extension 26, or otherwise damage the pendulum. While the action of the piston rings 56 is to tend to seal the space between the piston 55 and the walls of the cylinder 20, a certain amount of oil will flow past the piston and permit the latter to move upwardly. The action of the piston 55 within the cylinder 20 is thus similar to the well known dashpot; and as a result, the previously mentioned retarding action of the oil is provided. This retarding action, it is to be understood, permits the point 27 to be moved against the disk 36 with a firm, constant motion, while preventing any impact which would tend to damage the instrument. In addition, the relatively slow upward movement of the piston 55 permits the pendulum 25 to come to rest before contact is made between the point 27 and the disk 36. The spring 51 also prevents excessive pressure from being exerted by the point 27, since the spring is the connecting link between the piston and the spear 17, and greater movement of the spear 17 with respect to the cylinder 20 merely results in compression of the spring, and a corresponding slight increase in pressure of the point 27 against the disk 36, instead of permitting the entire weight of the cylinder 20 with its associated members to be supported by the point.

In the drilling of wells, it is customary to force a so-called "mud" to circulate through the well, carrying the chips of rock and other debris with it out of the well so that the bit may always bear against and touch the earth, rather than the pieces of rock which have already been cut. The depth of many present day wells is measured in thousands of feet; and as a consequence, the hydrostatic pressure of the mud at the bottom of the well is many thousand pounds. The exterior of the cylinder 20 is subjected to this high pressure, and if no provision were made for changing the pressure on the inside of the cylinder, the latter pressure would tend to remain at substantially atmospheric pressure. Under these conditions, the connecting rod 52 would be urged into the cylinder 20, and it is conceivable that if the normal separation between them were small, the point 27 would be forced against the disc 36 and mark the latter. This uncontrolled movement would give a false indication of the inclination of the well, and would prevent the apparatus from operating normally and properly when the adapter 12 is reached.

Figure 4:
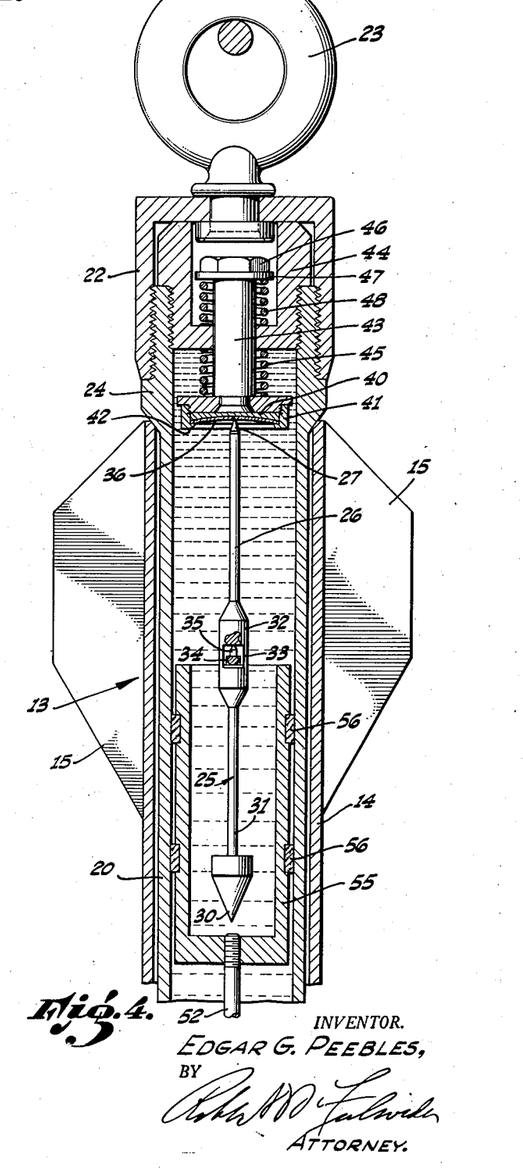
Fig. 4 is a cross sectional view taken at 4—4 in Fig. 3, and showing the various parts at the head of the device in somewhat greater detail.

To overcome this difficulty, I have developed the pressure equalizer shown in Fig. 4, and including the stem 43 which carries the backing plate 40, and the spring 48. Since the ring 23 is generally rotatably mounted in the cap 22, there is usually ample opportunity for the mud to enter the cap 22 and equalize the pressure between the inside and the outside of the cap. The pressure on the inside of the cap acts upon the stem 43, thus tending to force it, against the urging of spring 48, into the interior of the cylinder. Any movement of the stem 43 into the interior of the cylinder 20 will tend to increase the pressure therein, and since oil is essentially a non-compressible fluid, only a very small movement of the stem is necessary. When the instrument is raised to the top of the well, the pressure urging the stem 43 inwardly is decreased, and consequently the spring 48 and the increased pressure within the cylinder 20 urge the stem outwardly to equalize the pressure. Since the stem 43 is not subjected to the rough treatment that many of the remaining parts of the instrument are, and since it moves a relatively short distance, it is possible to provide a very good seal between the stem and the cap 44 so that mud will not enter the cylinder 20.

*Operation of preferred form*

When, in the drilling of a well, the inclination thereof is to be determined, the instrument 13 is lowered into the well by means of the wire line 28. The actual drilling operations are halted while the measurements and records are being made, but it is not necessary to remove the drill or drill string from the hole in order to use my instrument. The instrument 13 is lowered until the spear 17 enters the adapter 12, and the flanges 15 bear against and are centered by the collar at the upper end of the adapter. The lower end of the spear 17 is centered by the flanges forming the point 18, and the lower end of the adapter is centered by springs so that the entire instrument and adapter are coaxial with the drill collar 11, which in turn is coaxial with the lower end of the well. As the instrument 13 has been lowered, the pressure exerted upon it by the mud used in the drilling operation has been steadily increasing, and as a result, the stem 43 has been moved downwardly into the interior of the cylinder 20 so that the pressure within that cylinder has been substantially equalized at all times with the pressure on the outside thereof. The cylinder is connected by the cap 22 to the ring 23, and consequently the weight of the cylinder and the equipment directly connected to it have been supported by the ring 23. In addition, the outer housing 14 and the spear 17 have been in their lowermost positions, with respect to the cylinder 20 and the lower end of the outer housing has been resting upon the collar 21 so that the weight of the spear and the outer housing are carried by the cylinder.

As the instrument 13 reaches the lower end of the well, the flanges 15 fit within the collar of the adapter 12, centering the instrument and supporting the weight of the outer housing 14 and the spear 17. Further downward movement of the wire line 28 permits the cylinder 20, under its own weight, to continue its downward movement until the boss 24 at the upper end of the cylinder has moved downwardly a sufficient distance to engage and be supported by the upper end of the outer housing 14. An additional amount of the wire line 28 will almost invariably be lowered into the well, and this will rest upon the upper end of the cylinder 20, tending to force it to its lower limit of travel. The piston 55 has heretofore been at the lower end of the cylinder, since the connecting rod 52 and the spring 51 have urged it in this direction by reason of the position of the pin 50 and the housing 14 with respect to the cylinder 20. However, when the cylinder 20 is moved downwardly with respect to the outer housing 14, so that the latter supports the weight of the cylinder, the lower end of the cylinder is moved closer to the pin 50, while the spring 51 and the connecting rod 52 tend to maintain the piston 55 in the same position with respect to the housing, i. e., farther up in the cylinder. Because of the dashpot action of the piston 55, the latter is not stationary, but instead moves downwardly with the cylinder 20 and then slowly returns toward its original position as the oil from above the piston flows by the latter and between the piston rings 56 and the cylinder to a point beneath the piston. At the start of this upward movement, the piston 55 has been moved downwardly, while the pin 50 has remained stationary. The spring 51 is therefore compressed, and thus exerts a continuing upward force on the piston 55 while the latter moves and carries the point 27 into contact with the disk 36. As the connecting rod 52 moves into the cylinder 20, the increased volume thereof within the cylinder tends to increase the pressure on the oil within the latter; but the spring mounting of the back plate 40 and the stem 43 permits these members to move so that the pressure within the cylinder remains substantially constant. Since the diameter of the stem 43 is considerably greater than the diameter of the piston rod 52, only a relatively short movement of the stem is necessary to balance a relatively long movement of the connecting rod.

After the wire line 28 has been lowered to the point where the entire weight of the instrument 13 is supported by the flanges 15, the line is allowed to remain slack until it is certain that the point 27 has marked the disk 36. At that time, the line may be raised a few feet so that the point 18 is above the adapter 12, whereupon the natural torsional forces in the line will rotate the instrument 13 as it hangs freely suspended in the well. If the instrument is again lowered so that the flanges 15 again support the entire instrument, the process of recording the position of the pointer 27 will be repeated. The possibility that the instrument 13 will have the same rotational position with respect to the adapter 12 is extremely remote, and if the instrument is in proper working order, the second mark in the disk 36 should be the same radial distance from the center of the disk as the first mark but angularly displaced from it. A check on the accuracy of the instrument is thus readily available, and by making a series of marks, a multiple check is provided, which, in the case of a malfunctioning of the instrument, will indicate the cause of the malfunction. When the desired number of recordings have been made, the instrument is removed from the well by the wire line 28, and when it is once again on the surface, the cap 22 and the plug 44 are removed, and the disk 36 is removed from the backing plate 40. The position of the marks with respect to one of the concentric circles 37 provides a record of the inclination of the well; and if any corrective action is indicated, it may be taken at this time. Since it is unnecessary to remove the entire drill string and drill from the well in order to make this record, the drilling crew can more easily be induced to make records frequently and thus correct any deviations before the well has been drilled so far at this angle as to make such correction impossible. Since the records are in the convenient form of small disks, they may be readily marked for identification and then filed for future reference.

It will sometimes happen that the internal diameter of the tool joint 10 and the drill collar 11 are of such size and so related that it is undesirable or unnecessary to make use of the adapter 12. Under these circumstances, it is often desirable to have the flanges 15 of such a size that they will center the upper end of the instrument 13 with respect to the drill collar and tool joint, and to form the flanges of the point 18 so that the lower end of the spear is similarly centered. If the flanges 15 and 18 are thus of the same overall size, it will be seen that there will be no shoulder or other restriction for the flanges 15 to rest upon. This will be apparent from the fact that any shoulder which would support the flanges 15 would also support the tip 18. The flanges 15 will thus be devoid of any longitudinal support, though they will receive lateral support from the walls of the tool joint or of the drill collar; and the point 18 will thus travel downwardly until it is stopped by some constriction which will support it. The operation of the instrument 13, however, will be the same in both instances, since the spear 17 is firmly connected to the outer housing 14 at the joint 16; and any movement or lack of movement of one of these members is transmitted to the other so that the cylinder 20 operates in its normal fashion.

*Construction of modified form*

Figure 6:
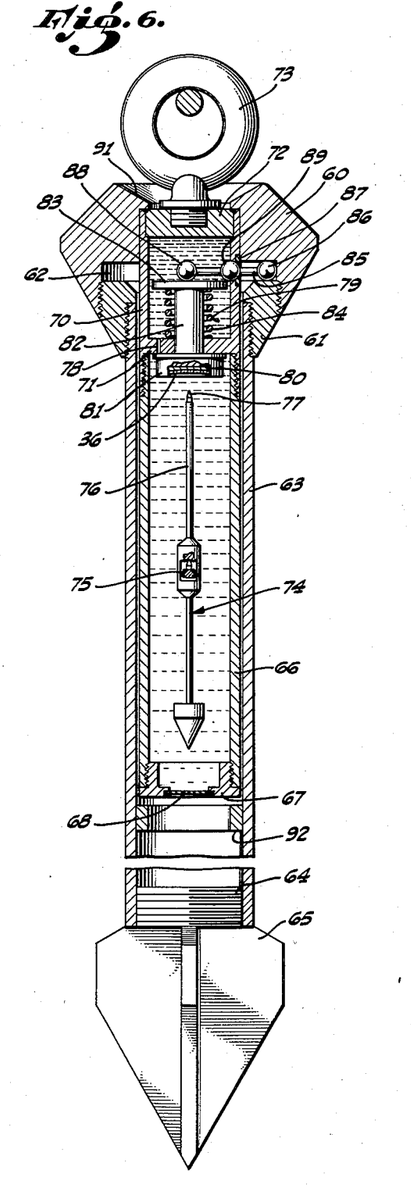
Fig. 6 is a cross sectional view, somewhat similar to Fig. 2, of a modified form of my device as it appears as the instrument is being lowered into the well.
Figure 7:
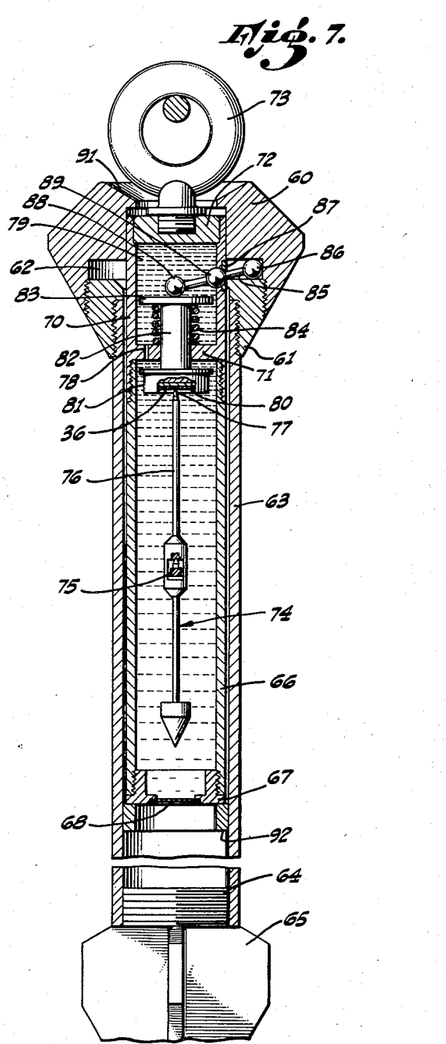
Fig. 7 is a view similar to Fig. 6 of my modified form with the parts as they appear when the instrument is in the process of making a record.

In Figs. 6 and 7 I have shown a modified form of construction wherein the making of the record is secured by the moving of a lever, rather than by the movement of a piston. The method of operating this form of instrument is substantially identical with the method of operating my preferred form, but the internal operation of the instrument itself is different. As seen in the drawings, the numeral 60 indicates a head having a shape somewhat similar to the flanges 15 and serving the same purpose, i. e., the centering of the instrument with respect to the well, and the supporting of the instrument. The head 60 is provided with a central annular recess at its lower portion, and a ring 61 is threadedly mounted in the recess, but does not extend the full depth thereof, so that a central annular cavity 62 is provided in the head. An outer housing 63, somewhat similar to the outer housing 14 of my preferred form and likewise cylindrical in shape, is threadedly attached to the ring 61 to extend downwardly and carry a spear 64 having a point 65 at its lower end. The spear 64 and point 65 may be similar to the spear 17 and point 18 of my preferred form, and they serve the same purpose and operate in the same manner.

Within the housing 63 is a cylinder 66, similar to the cylinder 20 and closed at its lower end by a plug 67 having therein a pressure equalizer of the type used in my preferred form, or, alternatively, a flexible diaphragm 68 for the same purpose. The upper end of the cylinder 66 is closed by a cap member 70, having a partition 71 therein immediately above the upper end of the cylinder; and an orifice 78 provides a restricted passageway through the partition. The cap member 70 is hollow above the partition 71 so that it is generally cup-shaped with flanges extending below the partition which are threadedly joined to the cylinder 66. A plug 72 is threaded into the upper end of the cap member 70 to form a chamber 79, and a hoisting ring 73, similar to the ring 23 of my preferred form, is mounted on the plug.

A pendulum 74, similar in all respects to the pendulum 25 of my preferred form, is mounted within the cylinder 66 by means of a cross member 75, similar to the cross member 34, and rigidly attached to the cylinder; and an upwardly extending projection 76 carries a point 77 on its upper end in a manner similar to that previously described. Immediately above the point 77 is a disk 36 held to a backing plate 80 by a threaded ring 81. A stem 82, similar to stem 43, supports the backing plate 80 and extends through the partition 71 and into the chamber 79. The upper end of the stem 82 is provided with a flange 83, and a compression spring 84 surrounds the stem and extends between the flange and the partition 71, urging the stem 82 and the backing plate 80 upwardly so that the latter bears against the partition.

When the backing plate 80 is in its uppermost position, bearing against the partition 71, the disk 36 is above the point 77 and the latter is free to move with respect to the cylinder 66 and thereby indicate the true vertical at all times. To bring the disk 36 and the point 77 together so that a record may be made, I use the lever system indicated. This lever system includes a lever 85 which is pivotally mounted in the wall of the cap member 70 by the bearing 89, and has one arm extending through the wall to fit within the annular space 62 between the head 60 and the ring 61. This outer arm is provided with a spherical end portion 86 so that as the lever 85 is rotated, the center of the sphere does not change its position with respect to the head 60. A seal 87, of any suitable type, is provided in the wall of the cap member 70 so that mud will not be forced into the chamber 79, and fluid will not escape therefrom. The inner end of the lever 85 is provided with a spherical end 88, similar to the spherical end 86, which bears against the flange 83 so that downward movement of the sphere 88 will be transmitted to the stem 82 and force the backing plate 80 down. The cylinder 66 and the chamber 79 are both completely filled with oil, and any downward movement of the stem 82 will cause oil to flow from the cylinder into the chamber. The rate of flow may be controlled by the size of the orifice 78, and the motion of the stem is thus retarded by a dashpot action similar to that of the piston 55 of my preferred form.

To cause the movement of the lever 85, the cylinder 66 and the cap member 70 are moved downwardly with respect to the head 60, thereby moving the bearing 89 of the lever in the wall of the cap member downwardly while the outer spherical end 86 remains stationary. The lever 85 amplifies this movement so that the inner spherical end 88 moves downwardly with respect to the cap member 70, urging the stem 82 downwardly so that oil is forced from cylinder 66 into the chamber 79 at a relatively slow rate, determined by the orifice 78, and the disk 36 is moved against the point 77 to make a record of the position of the latter, as described in my preferred form. The position of the various members at the time of recordation is shown in Fig. 7.

Movement of the cylinder 66 with respect to the head 60 is accomplished in a manner similar to that described in connection with the movement of the cylinder 20 with respect to the outer housing 14 of my preferred form. In my modified form, the head 60 is provided with an inwardly extending flange 91 which is adapted to bear against the upper end of the cap member 70, and which supports the head, the outer housing 63, the spear 64, and all associated equipment when the entire instrument is supported by the ring 73. Under these conditions, the cylinder 66 is in its uppermost position with respect to the head 60 and the outer housing 63, and the parts are in the position shown in Fig. 6.

When the instrument has been lowered into a well until some restriction bears against the head 60 or the point 65 and thus supports the entire weight of the instrument, the cylinder 66 moves downwardly with respect to the outer housing 63 until the plug 67 in the lower end of the cylinder bears against an inwardly extending flange or ring 92 welded or otherwise firmly attached to the outer housing. The ring 92 thus supports the entire weight of the cylinder 66 and all the members attached to it; and by properly locating the ring, the movement of the stem 82 will be just sufficient to cause the point 77 to puncture the disk 36 without placing a load on the extension 76 sufficient to damage the pendulum 74, its support 75, or the extension itself. This position is shown in Fig. 7.

*Operation of modified form*

To use my modified form of drift recording apparatus to determine the inclination of a well, an adapter 12 may be inserted between the drill collar 11 and the lower section 10 of the tool joint, or, if the internal dimensions of the tool joint and the drill collar are such as to make this practical, the adapter may be omitted, as described in connection with my preferred form. To make a record of the inclination of the well at its lower end, the modified form of recording apparatus is lowered into the well by means of a wire line attached to the ring 73, the instrument being lowered until the head 60 is supported by the upper end of the adapter 12, or until the point 65 is held by some constriction. Prior to the time when the head 60 or the point 65 is held by the constriction in the well, the entire weight of the instrument is supported by the ring 73 and the various portions of the device are in the position shown in Fig. 6. There it will be seen that the upper end of the cap member 70 bears against the inwardly extending flange 91 of the head 60 and thus supports the weight of the head, the outer housing 63, and the point 65. The cylinder 66 is in its uppermost position with respect to the head 60, and the lever 85 is in its upper position, permitting the stem 82 and the backing plate 80 to remain in their upper limiting positions. The pendulum 74 is supported by the cross member 75 so that the former is free to move and to maintain a vertical position at all times while oil inside the cylinder 66 surrounds the pendulum to damp any oscillation of the latter, and the extension 76 thus quickly comes to rest in a vertical position. The disk 36 is above the point 77 and spaced therefrom so that the disk provides no frictional restraint for the pendulum as the instrument is being lowered into the well.

When the recording device reaches the bottom of the well, the movement of the head 60 and the spear 65 is stopped by the restriction previously mentioned, and continued lowering of the wire line will permit the cylinder 66 to move downwardly by its own weight until stopped by the ring 92. The cylinder 66 has thus been moved downwardly with respect to the head 60; and when the cylinder has reached its lowermost position, the various elements are in the position shown in Fig. 7. In reaching this position, the movement of the cylinder 66 has carried the bearing 89 of the lever 85 downwardly, while the outer spherical end 86 has remained at the same height, thereby forcing the inner spherical end 88 downwardly with respect to the bearing, and urging the stem 82 and the flange 83 downwardly. This downward movement of the stem 82 is yieldably opposed by the spring 84; and the restricted flow of oil through orifice 78 further retards the speed of movement of the stem. As stem 82 has moved downwardly, the backing plate 80 and the disk 36 have been moved toward the point 77 until the latter has engaged and punctured the disk 36. By puncturing the disk 36 as mentioned, a permanent record is made of the inclination of the well at the point where the instrument is located. A second record may be made by raising the entire instrument a short distance by the wire line, and then again lowering it, as with my preferred form. The natural torsional instability of the wire line will rotate the instrument in a plane perpendicular to its axis, and it is almost certain that the instrument will have been turned with respect to the restriction, and the well, when the second record is made. By making two or more records of the inclination at a given point in the well, a double or multiple check is provided on the accuracy of the instrument, and any inaccuracy or malfunction may be immediately detected and corrected. In this way, accurate records may be kept of the inclination of the well throughout its entire length, and there will be little reason to disregard any record which shows a deviation by assuming it was caused by a defective instrument.

It will be seen that in both the preferred and modified forms of my drift recording apparatus, I have provided a device which may be operated to provide a check on its own accuracy, and which does not have any timing device or mechanisms which will make a record of the inclination of the device at a predetermined time after it is lowered into the well, regardless of its position along the length of the well. Instead, the device is operated at a predetermined point in the well where a restriction is placed, and the record is made at this point regardless of the length of time it has taken to lower the instrument to this position.

While I have shown and described a preferred and modified form of my invention, I do not wish to be limited to the particular form or arrangement of parts herein described and shown, except as covered by the following claims.

I claim:

1. A drift recording apparatus for measuring the inclination of a member with which it is aligned and including: a housing; a container within said housing and movable with respect thereto; a first means cooperating with said housing and said container whereby the latter may support said housing when in a first position; a second means cooperating with said housing and said container whereby the latter may be supported by said housing when in a second position; pendulous means within said container having a recording element attached thereto; a record blank within said container normally spaced from said recording element; a piston-like means within said container adapted to move said recording element and said record blank into and out of engagement; and means transmitting the movement of said container with respect to said housing, to said piston-like member and thereby move said recording element and said record blank together to record the inclination of said container when the latter is in said second position, and to separate said element and blank when said container is in its first position.

2. A drift recording apparatus for measuring the inclination of a member with which it is aligned and including: a housing; a container within said housing and movable with respect thereto; a first means cooperating with said housing and said container whereby the latter may support said housing when in a first position; a second means cooperating with said housing and said container whereby the latter may be supported by said housing when in a second position; pendulous means within said container having a recording element attached thereto; a record blank within said container normally spaced from said recording element; a piston-like means within said container adapted to move said recording element and said record blank into and out of engagement; means retarding the movement of said piston-like member with respect to said container so that said recording element and said record blank are forced into engagement without impact; and means transmitting the movement of said container with respect to said housing, to said piston-like member and thereby moving said recording element and said record blank together to record the inclination of said container when the latter is in said second position, and to separate said element and blank when said container is in said first position.

3. A drift recording apparatus as described in claim 2 wherein said retarding means includes: a substantially non-compressible fluid surrounding said piston-like member; and a restriction limiting the flow of fluid from one end of said piston-like member to the other.

4. A drift recording apparatus adapted to be lowered into a hole to measure the inclination thereof and including: a tubular housing; a member attached to said housing adapted to align and support the latter at the lower end of said hole; a container within said housing axially movable with respect thereto; means cooperatively associated with said housing and said container whereby the latter supports said housing when said apparatus is being lowered into said hole, and said container may be axially lowered to a second position with respect to said housing when the latter is at the bottom of said hole, said housing then supporting and aligning said container; a first piston extending from the exterior to the interior of said housing, adapted to move inwardly as the exterior pressure on said container increases, and to move outwardly as said exterior pressure decreases, whereby the interior and exterior pressures on said container are maintained substantially equal; a record blank mounted within said container and moved therewith; a pendulum within said container; a recording element attached to said pendulum for operation thereby, said element normally being spaced from said record blank; a second piston within said container and movable with respect thereto, said piston carrying said pendulum and said recording element; a restricting member adapted to limit the flow of a substantially non-compressible fluid within said container from one end of said second piston to the other, whereby the movement of said second piston within said container is retarded; a connecting rod attached to said second piston and extending through a wall of said container; and a spring means connecting said connecting rod to said housing, whereby downward movement of said container with respect to said housing will cause said record blank and said recording element to be urged together, providing a record of the inclination of said hole each time said container is lowered with respect to said housing, and said element and blank are urged apart when said container is raised with respect to said housing.

5. A drift recording apparatus adapted to be lowered into a hole to measure the inclination thereof and including: a tubular housing; a member attached to said housing adapted to align and support the latter at the lower end of said hole; a container within said housing axially movable with respect thereto; means cooperatively associated with said housing and said container whereby the latter supports said housing when said apparatus is being lowered into said hole, and said container may be axially lowered to a second position with respect to said housing when the latter is at the bottom of said hole, said housing then supporting and aligning said container; a flexible diaphragm mounted in a wall of said container and subjected to both the internal and external pressures acting on said container, said diaphragm moving inwardly as said external pressure increases, and outwardly as said external pressure decreases, whereby the internal and external pressures acting on said container are maintained substantially equal; a pendulum mounted within said container and moved therewith; a recording element attached to said pendulum for operation thereby; a record blank within said container and normally spaced from said recording element; a carrier for said record blank, movable with respect to said container; a restricting member adapted to limit the flow of a substantially non-compressible fluid within said container from one end of said carrier to the other, whereby the movement of said carrier is retarded; a lever pivotally attached to said container, extending through the wall thereof with one end engaged by said housing and the other end bearing against said record blank carrier; and spring means urging said carrier against said lever to hold said record blank out of contact with said recording element until said container is moved downwardly with respect to said housing, whereupon said lever forces said carrier downwardly, against the urging of said spring, and moves said record blank against said element, whereby a record of the inclination of said hole is made each time said container is lowered with respect to said housing, and said blank and said element are separated each time said container is raised.

6. A drift recording apparatus which includes: a housing having a chamber therein; supporting means at the upper end of said housing; a piston slidable within said chamber, movable along the longitudinal axis of said housing; a connecting rod attached to said piston and extending through said housing for movement with respect to the latter; an operating member projecting below said housing and movable with respect thereto; resilient means connecting said operating member to said connecting rod, whereby movement of said operating member is transmitted to said piston, urging said piston to its lowermost position when the weight of said apparatus is suspended from said supporting means, and urging said piston to an upper position, with respect to said housing, when the weight of said housing bears down against said operating means; pendulous means within said chamber having a recording element attached thereto; a record blank within said chamber normally spaced from said recording element; and means attached to said piston for moving said recording element and said record blank into and out of engagement to thereby record the inclination of said housing each time said operating member is moved toward said housing.

7. A drift recording apparatus which includes: a housing having a chamber therein; supporting means at the upper end of said housing from which the apparatus may be suspended; a piston within said chamber, slidable along the longitudinal axis of said housing; a connecting rod attached to said piston and extending through the lower wall of said chamber for movement with respect to the latter; an operating member extending below said housing and movable with respect thereto, said operating member assuming its most extended position when said apparatus is suspended from said supporting means, and assuming its most retracted position when the weight of said housing rests upon said operating member; spring means between said operating member and said connecting rod for transmitting the motion of said operating member to said connecting rod; a fluid within said chamber restraining the rate of motion of said piston, said piston thereby acting in the general manner of a dashpot plunger, and normally being in a first or lowermost position when said operating member is in the most extended position, and in a second or upper position when said operating member is in its most retracted position, said piston moving slowly between its first and second positions regardless of the rate of movement of said operating member; pendulous means within said chamber having a recording element attached thereto; a record blank receiving member within said chamber normally spaced from said recording element; and means attached to said piston for moving said recording element and said record blank receiving member relative to each other, said recording element making a record on a record blank held by said record blank receiving member to thereby record the inclination of said housing each time said piston is moved to said second position.

8. A drift recording apparatus which includes: a housing having a chamber therein; operating means projecting from said housing and movable along the longitudinal axis thereof; a piston within said chamber, slidable along the longitudinal axis of said housing; a fluid within said chamber; means restricting the flow of said fluid from one end of said piston to the other, whereby the rate of longitudinal movement of said piston is materially retarded; a connecting rod attached to said piston for movement therewith; spring means coupling said operating member to said connecting rod to form a resilient connection therebetween whereby a rapid movement of said operating member with respect to said housing will not cause an equal and simultaneous movement at the same rate by said piston, but the movement of said operating member urges the corresponding movement of said piston; pendulous means within said chamber having a recording element attached thereto, said pendulous means connected to said piston for movement therewith; and a record blank receiving member within said chamber normally spaced from said recording element but positioned to have a record blank carried by it, engaged by said recording member to make a record thereon each time said piston is moved toward said record receiving member.

EDGAR G. PEEBLES.

REFERENCES CITED

The following references are of record in the file of this patent:

UNITED STATES PATENTS

| Number | Name | Date |
|---|---|---|
| 1,895,615 | Elliott | Jan. 13, 1933 |
| 1,903,512 | McLaughlin et al. | Apr. 11, 1933 |
| 1,905,546 | Webster | Apr. 25, 1933 |
| 1,935,078 | Cavins | Nov. 14, 1933 |
| 2,100,418 | Welikonov | Nov. 30, 1937 |
| 2,109,853 | Strootman | Mar. 1, 1938 |
| 2,136,748 | Lottinger | Nov. 15, 1938 |
| 2,197,227 | Strength | Apr. 16, 1940 |
| 2,219,512 | Cooper et al. | Oct. 29, 1940 |
| 2,222,442 | Passler | Nov. 19, 1940 |
| 2,334,950 | Opacensky | Nov. 23, 1943 |
| 2,405,937 | Beal | Aug. 20, 1946 |
| 2,420,447 | Schadel | May 13, 1947 |

FOREIGN PATENTS

| Number | Country | Date |
|---|---|---|
| 10,764 | Great Britain | 1906 |